(12) United States Patent
Behera et al.

(10) Patent No.: US 11,953,034 B2
(45) Date of Patent: Apr. 9, 2024

(54) METHOD AND SYSTEM FOR MONITORING HEALTH OF A HYDRAULIC FLUID SUBSYSTEM

(71) Applicant: Baker Hughes Energy Technology UK Limited, Aberdeen (GB)

(72) Inventors: Ajay Kumar Behera, Bangalore (IN); Bhasker Rao Keely, Bangalore (IN); Nicholas Josep Ellson, Bristol (GB); Andrew Clarke, Nailsea (GB)

(73) Assignee: Baker Hughes Energy Technology UK Limited, Aberdeen (GB)

( * ) Notice: Subject to any disclaimer, the term of this patent is extended or adjusted under 35 U.S.C. 154(b) by 126 days.

(21) Appl. No.: 16/099,154

(22) PCT Filed: May 3, 2017

(86) PCT No.: PCT/US2017/030768
§ 371 (c)(1),
(2) Date: Nov. 5, 2018

(87) PCT Pub. No.: WO2017/196600
PCT Pub. Date: Nov. 16, 2017

(65) Prior Publication Data
US 2019/0211851 A1 Jul. 11, 2019

(30) Foreign Application Priority Data
May 10, 2016 (IN) .............................. 201641016300

(51) Int. Cl.
*F15B 19/00* (2006.01)
*F15B 11/10* (2006.01)
(Continued)

(52) U.S. Cl.
CPC ............ *F15B 19/005* (2013.01); *F15B 11/10* (2013.01); *F16K 37/0083* (2013.01);
(Continued)

(58) Field of Classification Search
CPC ............. G05B 23/0243; F15B 2211/87; F15B 2211/864; F15B 2211/212;
(Continued)

(56) References Cited

U.S. PATENT DOCUMENTS

| 5,267,440 | A * | 12/1993 | Nakamura ............ E02F 9/2232 60/426 |
| 2008/0319726 | A1 | 12/2008 | Berge et al. |

(Continued)

FOREIGN PATENT DOCUMENTS

| EP | 2 302 479 A2 | 3/2011 |
| EP | 2 584 420 A1 | 4/2013 |

OTHER PUBLICATIONS

International Search Report and Written Opinion issued in connection with corresponding PCT Application No. PCT/US17/030768 dated Aug. 4, 2017.
International Preliminary Report on Patentability issued in connection with corresponding PCT Application No. PCT/US17/030768 dated Nov. 13, 2018.

*Primary Examiner* — Jennifer Bahls
(74) *Attorney, Agent, or Firm* — Hogan Lovells US LLP (57) ABSTRACT

A method for monitoring health of a hydraulic fluid subsystem is presented. The method includes determining a plurality of forces acting on an actuator of the hydraulic fluid subsystem, determining a plurality of parameters based on at least one of an actuator inlet flow rate, an actuator outlet flow rate, and the plurality of forces acting on the actuator, receiving a valve inlet pressure of at least one of oil and gas flowing through a pipe while entering a valve operationally coupled to the actuator and a valve outlet pressure of the at least one of the oil and the gas flowing through the pipe while flowing out of the valve, and monitoring the health of the hydraulic fluid subsystem based on at least one of the plurality of parameters, the valve inlet pressure, and the valve outlet pressure.

20 Claims, 3 Drawing Sheets

(51) Int. Cl.
  *F16K 37/00* (2006.01)
  *F15B 20/00* (2006.01)
(52) U.S. Cl.
  CPC ........ *F16K 37/0091* (2013.01); *F15B 20/005* (2013.01); *F15B 2211/212* (2013.01); *F15B 2211/6306* (2013.01); *F15B 2211/6309* (2013.01); *F15B 2211/6313* (2013.01); *F15B 2211/6326* (2013.01); *F15B 2211/6336* (2013.01); *F15B 2211/634* (2013.01); *F15B 2211/7052* (2013.01); *F15B 2211/855* (2013.01); *F15B 2211/857* (2013.01); *F15B 2211/864* (2013.01); *F15B 2211/87* (2013.01)
(58) Field of Classification Search
  CPC .......... F15B 2211/857; F15B 2215/855; F15B 2211/6306; F15B 11/10; F15B 19/005; F15B 2211/6326; F15B 2211/634; F15B 2211/6336; F15B 2211/6313; F15B 211/6313; F15B 2211/16313; F15B 2211/635; F16K 37/0091

See application file for complete search history.

(56) References Cited

U.S. PATENT DOCUMENTS

| | | |
|---|---|---|
| 2010/0161250 A1 | 6/2010 | Tanju et al. |
| 2011/0071966 A1* | 3/2011 | Holley .................. E21B 47/001 |
| | | 706/12 |
| 2014/0082304 A1 | 3/2014 | Clarke |
| 2016/0187221 A1* | 6/2016 | Rannow .............. G01M 3/2807 |
| | | 73/40.5 R |
| 2019/0169982 A1* | 6/2019 | Hauge .................... E21B 47/07 |

* cited by examiner

METHOD AND SYSTEM FOR MONITORING HEALTH OF A HYDRAULIC FLUID SUBSYSTEM

BACKGROUND

Embodiments of the present invention relate generally to hydraulic fluid systems and more particularly to a system and method for monitoring health of a hydraulic fluid subsystem.

Hydraulic systems such as subsea equipment/systems associated with the production of oil and gas is generally designed with a longer design life. However, faults and failures may regularly occur within the equipment. Intervention operations to recover failed modules may be extremely costly and the availability of vessels to perform such operations at short notice may be limited.

The subsea equipment failure, for example, may include breakdown of resistance in electrical conductors' insulation and/or breakdown of the conductors themselves, leaks within hydraulic and chemical systems, wear within choke valves, wear within valve actuators, failure of controlling electronics, or the like.

Typically, for detection of the subsea equipment failures, sensors are fitted on or inside the subsea equipment. The sensors measure various parameters within the electrical/electronic, hydraulic, chemical and production components of the subsea equipment. Such measurements are monitored via a control system located topside, i.e. at the surface either on land or on a vessel or a platform. The control system monitors the measurements, and alerts an operator when an abnormal condition exists in the subsea equipment. By way of simple example, the monitoring system may be set to raise an alarm once a pressure sensor measures a pressure higher than a predetermined value.

The control system, while raising the alarm, generally produces a large amount of telemetry data, making it difficult for an operator to understand the health of the equipment. Additionally, such alarms do not provide detailed information on the type of failure or the location of failure. Consequently, such information may affect the reaction time to a problem resulting in increase in time for diagnosis of the problem and subsequent resolution of the problem. Additionally, the alarms may be raised after the abnormal condition has already well-developed. Therefore scheduling of maintenance prior to failure of the equipment, may not be feasible.

Accordingly, a method and a system for monitoring health of a hydraulic fluid subsystem are desirable.

BRIEF DESCRIPTION

In accordance with one embodiment, a method for monitoring health of a hydraulic fluid subsystem is presented. The method includes determining a plurality of forces acting on an actuator of the hydraulic fluid subsystem, determining a plurality of parameters based on at least one of an actuator inlet flow rate ($q_3$), an actuator outlet flow rate ($q_3'$), an area of a cylinder of the actuator, a volume of the cylinder, a damping coefficient of the cylinder, a stiffness of a spring in the cylinder, and the plurality of forces acting on the actuator, receiving a valve inlet pressure ($p_6$) of at least one of oil and gas flowing through a pipe while entering a valve operationally coupled to the actuator and a valve outlet pressure ($p_7$) of the at least one of the oil and the gas flowing through the pipe while flowing out of the valve, and monitoring the health of the hydraulic fluid subsystem based on at least one of the plurality of parameters, the valve inlet pressure ($p_6$), and the valve outlet pressure ($p_7$).

In accordance with another embodiment, a system is presented. The system includes a processing subsystem operationally coupled to a first sensing device and a second sensing device and configured to determine a plurality of forces acting on an actuator of a hydraulic fluid subsystem, determine a plurality of parameters based on at least one of an actuator inlet flow rate ($q_3$), an actuator outlet flow rate ($q_3'$), an area of a cylinder of the actuator, a volume of the cylinder, a damping coefficient of the cylinder, a stiffness of a spring in the cylinder, and the plurality of forces acting on the actuator, receive a valve inlet pressure ($p_6$) of at least one of oil and gas flowing through a pipe while entering a valve operationally coupled to the actuator and a valve outlet pressure ($p_7$) of the at least one of the oil and the gas flowing through the pipe while flowing out of the valve, and monitor health of the hydraulic fluid subsystem based on at least one of the plurality of parameters, the valve inlet pressure ($p_6$) and the valve outlet pressure ($p_7$).

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "control system" or "controller" may include either a single component or a plurality of components, which are either active and/or passive and are connected or otherwise coupled together to provide the described function or functions. It is noted that data, signals or measurements described in the present application may be preprocessed for removal of noise.

Figure 1:
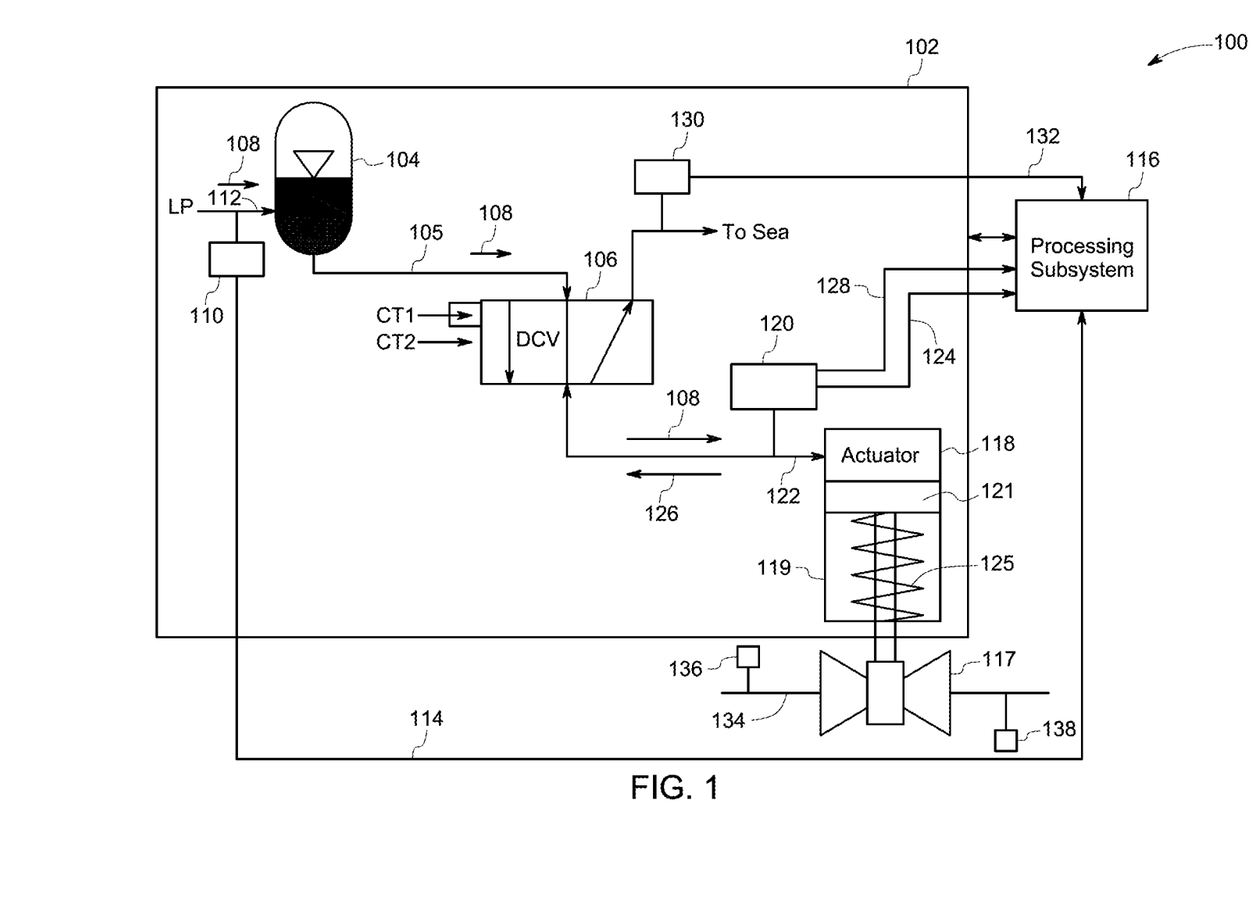
FIG. 1 is a diagrammatic illustration of a system for monitoring health of a hydraulic fluid subsystem in accordance with one embodiment of the present invention.

FIG. 1 is a diagrammatic illustration of a system 100 for monitoring the health of a hydraulic fluid subsystem 102 in accordance with one embodiment of the present invention. The hydraulic fluid subsystem 102, for example, may be used with/in subsea equipment/system (not shown) associated with the production of oil and gas. In such an embodiment, the health of the hydraulic fluid subsystem 102 is indicative of the health of the subsea equipment/system. The hydraulic fluid subsystem 102 is used with/in the subsea equipment/system for controlling a plurality of valves. Particularly, the hydraulic fluid subsystem 102 is used with/in the subsea equipment/system for opening or closing the valves. The valves, for example, may include a choke valve, a production master valve, a production wing valve, or the like. The valves, for example, are operated to control the production of oil and gas, and to shut-down the production of the oil and gas during emergency situations. In the illustrated embodiment, the hydraulic fluid subsystem 102 is used to control a single valve 117. In other embodiments, the hydraulic fluid subsystem 102 may control opening and closing of more than one valve.

The hydraulic fluid subsystem 102 is operationally coupled to a processing subsystem 116. The processing subsystem 116 may or may not be located at a remote location from the location of the hydraulic fluid subsystem 102. Furthermore, the hydraulic fluid subsystem 102 includes an accumulator 104, one or more directional control valves (DCV) 106, and an actuator 118. The accumulator 104, for example, may be located in subsea, on a shore, on a platform or a vessel. It is noted that for ease of understanding a single accumulator 104 is shown, however, more than one accumulators may be present in the hydraulic fluid subsystem 102. The accumulator 104 is configured to receive a hydraulic fluid 108 from a reservoir (not shown) or a hydraulic power unit (HPU) (not shown) at an accumulator supply pressure ($p_1$). The hydraulic fluid subsystem 102 further includes a first sensing device 110 disposed proximate to a supply port 112 of the accumulator 104. In one embodiment, the first sensing device 110 may be disposed on a pipe connecting the reservoir or the HPU to the accumulator 104. The first sensing device 110 is configured to measure the accumulator supply pressure ($p_1$) and generate an electrical signal 114 representative of the accumulator supply pressure ($p_1$). The first sensing device 110 is operationally coupled to the processing subsystem 116 and configured to transmit the electrical signal 114 to the processing subsystem 116.

The accumulator 104 is coupled to the DCV 106. In the illustrated embodiment, the accumulator 104 is operationally coupled to the DCV 106 via a pipe 105. The accumulator 104 is configured to supply the hydraulic fluid 108 to the DCV 106 via the pipe 105. The accumulator 104, for example, is configured to supply the hydraulic fluid 108 to the DCV 106 at a directional-control-valve-supply pressure ($p_2$). In one embodiment, sensing devices may be disposed on the pipe 105 to measure the directional-control-valve-supply pressure ($p_2$), and transmit the directional-control-valve-supply pressure ($p_2$) to the processing subsystem 116. The processing subsystem 116 may receive the directional-control-valve-supply pressure ($p_2$) from the sensing devices. In another embodiment, the processing subsystem 116 is configured to determine the directional-control-valve-supply pressure ($p_2$) based on the accumulator supply pressure ($p_1$). In one embodiment, the processing subsystem 116 may determine the directional-control-valve-supply pressure ($p_2$) using the following equation (1):

$$p_2 = p_1 - dP \qquad (1)$$

wherein dP is a drop in pressure between the accumulator 104 and the DCV 106. The DCV 106 is operationally coupled to the actuator 118. The actuator 118 is configured to control the valve 117, for opening or closing the valve 117. The actuator 118 includes a cylinder 119 and a piston 121 disposed in the cylinder 119. In the illustrated embodiment, the actuator 118 is a hydraulic actuator and hence configured to operate in two modes including a power stroke and a return stroke.

During the power stroke of the actuator 118, the DCV 106 is configured to transfer the hydraulic fluid 108 to the actuator 118. The hydraulic fluid 108 is transferred from the DCV 106 to the actuator 118 at an actuator inlet pressure ($p_3$). During the return stroke, the actuator 118 is configured to transfer a hydraulic fluid 126 (hereinafter referred to as 'actuator hydraulic fluid 126) from the actuator 118 to the DCV 106. The actuator hydraulic fluid 126 is transferred from the actuator 118 to the DCV 106 at an actuator outlet pressure ($p_3'$). The DCV 106 may vent out the actuator hydraulic fluid 126 received from the actuator 118 at a vent pressure ($p_5$). In one embodiment, the DCV 106 may vent out the actuator hydraulic fluid 126 to sea. In another embodiment, the DCV 106 may vent out the actuator hydraulic fluid 126 back to surface.

The hydraulic fluid subsystem 102 further includes a second sensing device 120 configured to measure the actuator inlet pressure ($p_3$) of the actuator hydraulic fluid 126 during the power stroke of the actuator and generate an electrical signal 124 representative of the actuator inlet pressure ($p_3$). The second sensing device 120 is further configured to measure the actuator outlet pressure ($p_3'$) of the actuator hydraulic fluid during the return stroke of the actuator and generate an electrical signal 128 representative of the actuator outlet pressure ($p_3'$). It should be noted herein that although in the illustrated embodiment, the same sensing device 120 measures the actuator inlet pressure ($p_3$) of the hydraulic fluid 108 and the actuator outlet pressure ($p_3'$) of the actuator hydraulic fluid 126, in certain other embodiments, different sensing devices may measure the actuator inlet pressure ($p_3$) and the actuator outlet pressure ($p_3'$). In the illustrated embodiment, the second sensing device 120 is disposed on a connector 122 between the DCV 106 and the actuator 118. In one embodiment, the connector 122 may be a pipe. The second sensing device 120 is further operationally coupled to the processing subsystem 116. The processing subsystem 116 is further configured to receive the signal 124 representative of the actuator inlet pressure ($p_3$) of the hydraulic fluid 108 received by the actuator 118 from the DCV 106. The processing subsystem 116 is further configured to receive the signal 128 representative of the actuator outlet pressure ($p_3'$) of the actuator hydraulic fluid 126.

The hydraulic fluid subsystem 102 further includes a third sensing device 130 configured to measure the vent pressure ($p_5$) and generate an electrical signal 132 representative of the vent pressure ($p_5$). The third sensing device 130 is operationally coupled to the processing subsystem 116 and configured to transmit the third electrical signal 132 to the processing subsystem 116.

The processing subsystem 116 is configured to determine a flow rate ($q_3$) (hereinafter 'actuator inlet flow rate ($q_3$)') of the hydraulic fluid 108 received by the actuator 118 from the DCV 106. In one embodiment, the processing subsystem 116 is configured to determine the actuator inlet flow rate ($q_3$) of the hydraulic fluid 108 received by the actuator 118 based on at least one of the directional-control-valve-supply pressure ($p_2$) and the actuator inlet pressure ($p_3$). In one particular embodiment, the processing subsystem 116 is configured to determine the actuator inlet flow rate ($q_3$) of the hydraulic fluid 108 received by the actuator 118 based on at least one of the directional-control-valve-supply pressure ($p_2$), the actuator inlet pressure ($p_3$), a determined constant, a specific gravity of the hydraulic fluid 108, and a flow coefficient of the DCV 106. It should be noted herein that the processing subsystem 116 is configured to determine the actuator inlet flow rate ($q_3$) during a power stroke of the actuator 118. Determination of the actuator inlet flow rate ($q_3$) is represented by equation (2).

$$q_3 = N_1 c_v \sqrt{\frac{p_2 - p_3}{G_f}} \quad (2)$$

wherein $N_1$ is representative of a determined constant, $c_v$ is representative of a flow coefficient of the DCV 106, $p_2$ is representative of the directional-control-valve-supply pressure of the hydraulic fluid 108 transferred from the accumulator 104 to the DCV 106, $p_3$ is representative of the actuator inlet pressure of the hydraulic fluid 108 transferred from the DCV 106 to the actuator 118, and $G_f$ is the specific gravity of the hydraulic fluid 108.

The processing subsystem 116 is further configured to determine a flow rate ($q_3'$) (hereinafter 'actuator outlet flow rate ($q_3'$)') of the actuator hydraulic fluid 126 received by the DCV 106 from the actuator 118. In one embodiment, the processing subsystem 116 is configured to determine the actuator outlet flow rate ($q_3'$) of the actuator hydraulic fluid 126 based on at least one of the vent pressure ($p_5$) and the actuator outlet pressure ($p_3'$). In one particular embodiment, the processing subsystem 116 is configured to determine the actuator outlet flow rate ($q_3'$) of the actuator hydraulic fluid 126 based on at least one of the actuator outlet pressure ($p_3'$), the vent pressure ($p_5$), a determined constant, a specific gravity of the actuator hydraulic fluid 126, and a flow coefficient of the DCV 106. It should be noted herein that the processing subsystem 116 is configured to determine the actuator outlet flow rate ($q_3'$) during a return stroke of the actuator 118. Determination of the actuator outlet flow rate ($q_3'$) is represented by equation (3).

$$q_3' = N_1 c_v' \sqrt{\frac{p_3' - p_5}{G_f}} \quad (3)$$

wherein $N_1$ is representative of a determined constant, $c_v'$ is representative of a flow coefficient of the DCV 106, $p_5$ is representative of the vent pressure, $p_3'$ is representative of the actuator outlet flow rate, and $G_f$ is a specific gravity of the actuator hydraulic fluid 126. The processing subsystem 116 is additionally configured to determine a plurality of forces acting on the actuator 118. The forces acting on the actuator 118, for example, may include a hydraulic force, at least one spring force, a hyperbaric force, a canister fluid force, a hydraulic fluid force, a viscous friction force due to seal friction, a viscous friction force due to seat friction, a valve friction force, a seal friction force, other friction forces, or the like. The processing subsystem 116 is further configured to generate a plurality of dynamic equations based on the plurality of forces, the actuator inlet flow rate ($q_3$), the actuator outlet flow rate ($q_3'$), an area (A) of the cylinder 119 of the actuator 118, a volume (V) of the cylinder 119, a damping coefficient of the cylinder 119, a spring stiffness of a spring 125 in the cylinder 119, and the forces acting on the actuator 118. Examples of the dynamic equations are shown in equations (4) and (5) below.

The processing subsystem 116 is further configured to determine a plurality of parameters based on the dynamic equations. The parameters, for example, may include a pressure generated inside the actuator 118, an amount of displacement and acceleration of the piston 121 located in the cylinder 119 caused by at least one of the actuator inlet flow rate ($q_3$) and the actuator outlet flow rate ($q_3'$), an amount of time for reaching a desired amount of displacement of the piston 121, a force required to open the actuator 118, an amount of time for reaching an end position of the piston 121. The pressure generated inside the actuator 118, displacement and acceleration of the piston 121, for example, is determined by solving two dynamic equations (4) and (5).

$$\overset{\circ}{p} = \frac{\beta}{V}\left(-A\overset{\circ}{x} + q_3 - q_3'\right) \quad (4)$$

$$m\overset{\circ\circ}{x} = pA - b\overset{\circ}{x} - kx - F + \varepsilon \quad (5)$$

wherein $\overset{\circ}{p}$ is representative of dynamic pressure in the cylinder 119 or a rate of change of pressure inside the cylinder 119 of the actuator 118, $\beta$ is representative of bulk modulus of the hydraulic fluid 108 or the actuator hydraulic fluid 126, V is representative of volume of the cylinder 119, A is representative of an area of the cylinder 119, $\overset{\circ}{x}$ is representative of rate of displacement of the piston 121, $q_3$ is representative of the actuator inlet flow rate, $q_3$ is representative of the actuator outlet flow rate, m is representative of a mass of the piston 121, $\overset{\circ\circ}{x}$ is representative of the acceleration of the piston 121, p is representative of the pressure generated inside the cylinder 119/actuator 118, k is representative of stiffness of the spring 125 in the cylinder 119, x is representative of displacement of the piston 121, F is representative of one or more of the forces acting on the actuator 118, and $\varepsilon$ is representative of modelling error.

As previously noted, the system 100 includes the valve 117. The valve 117 is coupled to a pipe 134 used for the flow of, for example, oil and/or gas. The valve 117 is configured to control the flow of the oil and/or gas flowing through the pipe 134. A fourth sensing device 136 and a fifth sensing device 138 is operationally coupled to the pipe 134. The fourth sensing device 136 is used to measure a valve inlet pressure ($p_6$) of the oil and/or gas flowing through the pipe 134 while entering the valve 117 and the fifth sensing device 138 is used to measure a valve outlet pressure ($p_7$) of the oil and/or gas flowing through the pipe 134 while flowing out of the valve 117. The difference between the valve outlet pressure ($p_7$) and the valve inlet pressure ($p_6$) is referred to as a differential pressure across the valve 117.

The processing subsystem 116 is configured to determine the health of the hydraulic fluid subsystem 102 based on at least one of the actuator inlet flow rate ($q_3$), the actuator outlet flow rate ($q_3'$) and the determined parameters. For example, the processing subsystem 116 may determine a defect in at least one component of the hydraulic fluid subsystem 102 based on at least one of the actuator inlet flow rate ($q_3$), the actuator outlet flow rate ($q_3'$) and the determined parameters. The defects, for example may include a seal leakage, a stem and piston damage of the actuator 118, a jam in the actuator 118, a failure of the spring 125, or the like. For example, the processing subsystem 116 may determine the jam of the piston 121 of the actuator 118 if an abnormal difference exists between the pressure generated inside the actuator 118 and the actuator inlet pressure ($p_3$). For example, a difference between the pressure generated inside the actuator 118 and the actuator inlet pressure ($p_3$) is determined as abnormal based on one or more factors. The factors, for example, may include a pressure of the hydraulic fluid 108, a friction of the piston 121, the valve inlet pressure ($p_6$) of the oil and/or gas flowing through the pipe 134 while entering the valve 117, the valve outlet pressure ($p_7$) of the oil and/or gas flowing through the pipe 134 while flowing out of the valve 117, or the like. In one embodiment, the jam of the piston 121 of the actuator 118 may be determined by comparing a volume of hydraulic fluid 108 flowing inside the actuator 118 to a determined volume of the cylinder 119 during a power stroke of the actuator 118.

The processing subsystem 116 is configured to determine a presence of the seal leakage or a leakage in the actuator 118 by comparing a volume of hydraulic fluid 108 flowing inside the actuator 118 to a determined volume of the cylinder 119 during a power stroke of the actuator 118. For example, if the volume of hydraulic fluid 108 flowing inside the actuator 118 is greater than a determined volume of the cylinder 119, then a presence of the seal leakage or a leakage in the actuator 118 may be determined. Additionally, the processing subsystem 116 is configured to determine the presence of the seal leakage or the leakage in the actuator 118 if an amount of time for attaining a desired amount of displacement of the piston 121 within the cylinder 119 is greater than a predetermined amount of time. The predetermined amount of time, for example, may be determined by a model. The predetermined amount of time may be a variable. The predetermined amount of time, for example, is a function of a plurality of factors including the valve inlet pressure ($p_6$) of the oil and/or gas flowing through the pipe 134 while entering the valve 117, the valve outlet pressure ($p_7$) of the oil and/or gas flowing through the pipe 134 while flowing out of the valve 117, a pressure inside the actuator 118, and a plurality of constants, such as a spring force, friction within the actuator 118, resistance in the valve 117, or the like.

Additionally, the processing subsystem 116 is configured to determine a presence of stem damage or damage in the piston 121 of the actuator 118 if an amount of time for reaching an end position of the piston 121 is greater than a predetermined amount of time. The predetermined amount of time, for example, may be determined by a model. The predetermined amount of time may be a variable. The predetermined amount of time is a function of a plurality of factors including the valve inlet pressure ($p_6$) of the oil and/or gas flowing through the pipe 134 while entering the valve 117, a valve outlet pressure of the oil and/or gas flowing through the pipe 134 while flowing out of the valve 117, a pressure inside the actuator 118, and a plurality of constants, such as a spring force, friction within the actuator 118, a valve resistance or the like. Furthermore, the processing subsystem 116 is configured to compare the force required to open the actuator 118 to a threshold force to determine the failure of the spring 125. For example, if the force required to open the actuator 118 is less than a threshold force, then the failure of the spring 125 may be determined. The threshold force, for example, may be a variable. For example, the threshold force may be a function of the valve inlet pressure ($p_6$) of the oil and/or gas flowing through the pipe 134, the valve outlet pressure ($p_7$) of the oil and/or gas flowing through the pipe 134 while flowing out of the valve 117, the differential pressure across the valve 117, and a plurality of constants such as the spring force, the friction within the actuator 118, a valve resistance, or the like.

Additionally, the processing subsystem 116 is configured to determine an amount of flow that entered the cylinder 119 while a minimum actuator inlet pressure is changed to a maximum actuator inlet pressure. Furthermore, the processing subsystem 116 is configured to compare the amount of flow to a determined swept volume of the cylinder 119 to determine whether a leak or jam exists in the cylinder 119 of the actuator 118. The swept volume, for example, may be retrieved by the processing subsystem 116 from a data repository (not shown) operatively coupled to the processing subsystem 116. Furthermore, the swept volume, for example may be determined before or after commissioning of the actuator 118. For example, the processing subsystem 116 may compare at least one of the actuator inlet flow rate ($q_3$), the actuator outlet flow rate ($q_3'$) and the determined parameters to respective determined thresholds to determine the defect in the hydraulic fluid subsystem 102. For example, the processing subsystem 116 may determine the defect in the hydraulic fluid subsystem 102 if the actuator inlet flow rate ($q_3$), the actuator outlet flow rate ($q_3'$), and the determined parameters exceed the respective determined thresholds. In one embodiment, the processing subsystem 116 may be configured to determine the health of the hydraulic fluid subsystem 102 by comparing the pressure (p) generated inside the actuator 118 to the actuator inlet pressure ($p_3$). The processing subsystem 116 may further communicate to a user about the presence or absence of the defect or health issues of the hydraulic fluid subsystem 102. Furthermore, if the presence of the defect is determined in the hydraulic fluid subsystem 102, then a user may determine and execute a corrective action to remove the defect from the hydraulic fluid subsystem 102.

Figure 2:
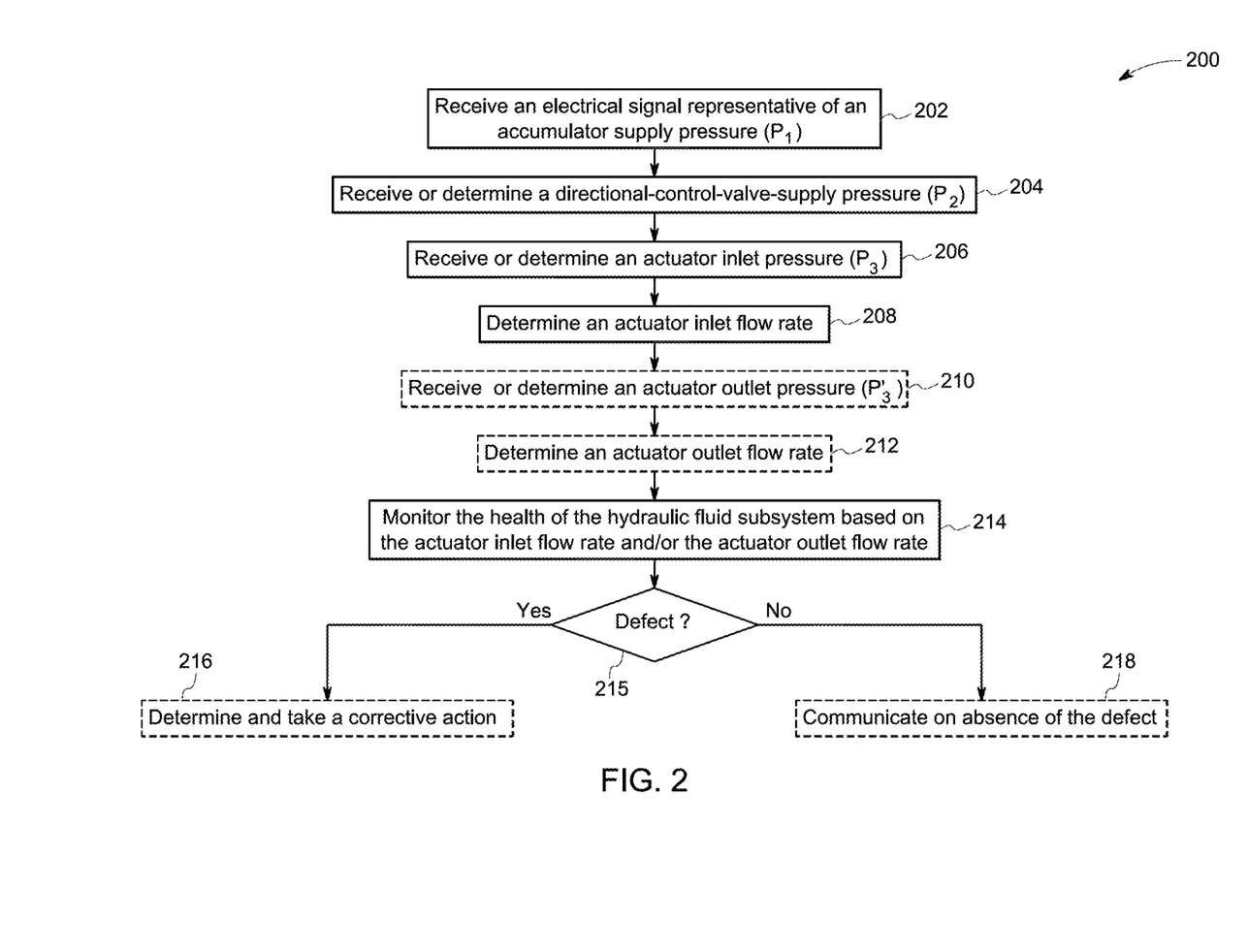
FIG. 2 is a flow chart that illustrates an exemplary method for monitoring health of a hydraulic fluid subsystem in accordance with one embodiment of the present invention.

FIG. 2 is a flow chart that illustrates an exemplary method 200 for monitoring the health of a hydraulic fluid subsystem in accordance with one embodiment of the present invention. At block 202, an electrical signal representative of an accumulator supply pressure ($p_1$) of a hydraulic fluid supplied to an accumulator in a hydraulic fluid subsystem is received. The electrical signal representative of the accumulator supply pressure ($p_1$), for example, is received by a processing subsystem from a first sensing device.

At block 204, a directional-control-valve-supply pressure ($p_2$) of the hydraulic fluid transferred by the accumulator to a directional control valve, is determined or received. In one embodiment, the directional-control-valve-supply pressure ($p_2$) may be received from a sensing device that measures the directional-control-valve-supply pressure ($p_2$). In another embodiment, the directional-control-valve-supply pressure ($p_2$), for example, is determined based on the accumulator supply pressure ($p_1$). For example, the directional-control-valve-supply pressure ($p_2$) may be determined using equation (1) mentioned herein. Subsequently at block 206, an actuator inlet pressure ($p_3$) of the hydraulic fluid transferred from the DCV to an actuator is received or determined. An electrical signal representative of the actuator inlet pressure ($p_3$), for example, is received by the processing subsystem 116.

At block 208, an actuator inlet flow rate ($q_3$) of the hydraulic fluid transferred from the DCV to the actuator is determined. In one embodiment, the actuator inlet flow rate ($q_3$) is determined based on at least one of the directional-control-valve-supply pressure ($p_2$) and the actuator inlet pressure ($p_3$). In another embodiment, the actuator inlet flow rate ($q_3$) may be determined based on at least one of the directional-control-valve-supply pressure ($p_2$), the actuator inlet pressure ($p_3$), a determined constant, a specific gravity of the hydraulic fluid, and a flow coefficient of the DCV. An example of determination of the actuator inlet flow rate ($q_3$) is shown with reference to equation (2) mentioned herein.

At block 210, an actuator outlet pressure ($p_3'$) of an actuator hydraulic fluid transferred from the actuator to the DCV is received or determined. An electrical signal representative of the actuator outlet pressure ($p_3'$), for example, is received by the processing subsystem from the second sensing device. At block 212, an actuator outlet flow rate ($q_3'$) of an actuator hydraulic fluid transferred from the actuator to the DCV is determined. In one embodiment, the actuator outlet flow rate ($q_3'$) is determined based on at least one of the actuator outlet pressure ($p_3'$) and a vent pressure ($p_5$) of the actuator hydraulic fluid vented out of the DCV. In another embodiment, the actuator outlet flow rate ($q_3'$) is determined based on at least one of the actuator outlet pressure ($p_3'$), a vent pressure ($p_5$) of a portion of the actuator hydraulic fluid, a determined constant, a specific gravity of the hydraulic fluid, and a flow coefficient of the DCV. An example of determination of the actuator outlet flow rate ($q_3'$) is mentioned herein with reference to equation (3).

At block 214, the health of the hydraulic fluid subsystem is determined based on at least one of the actuator inlet flow rate ($q_3$) and the actuator outlet flow rate ($q_3'$). In one embodiment, the actuator inlet flow rate ($q_3$) and the actuator outlet flow rate ($q_3'$) may be compared to respective thresholds to determine a defect in the hydraulic fluid subsystem. For example, the defect in the hydraulic fluid subsystem may be determined when the actuator inlet flow rate ($q_3$) and the actuator outlet flow rate ($q_3'$) exceed the respective determined thresholds. In another embodiment, monitoring the health of the hydraulic fluid subsystem may include determining a defect in the hydraulic fluid subsystem based on one or more parameters determined based on at least one of the actuator inlet flow rate ($q_3$) and the actuator outlet flow rate ($q_3'$). Determination of the parameters and monitoring the health of the hydraulic fluid subsystem based at least on one of the parameters is explained in greater detail with reference to FIG. 3. Subsequently, at block 215 a check is carried out to identify if a defect is present in the hydraulic fluid subsystem. If at block 215, it is determined that the defect is present in the hydraulic fluid subsystem, then the control is transferred to block 216. At block 216 a corrective action may be determined and executed by a user. The corrective action, for example, may include replacing or repairing the defective component. Referring back to block 215, if it is determined that the defect is absent in the hydraulic fluid subsystem, then the control may be transferred to block 218. At block 218, the user may be optionally informed about the absence of the defect.

Figure 3:
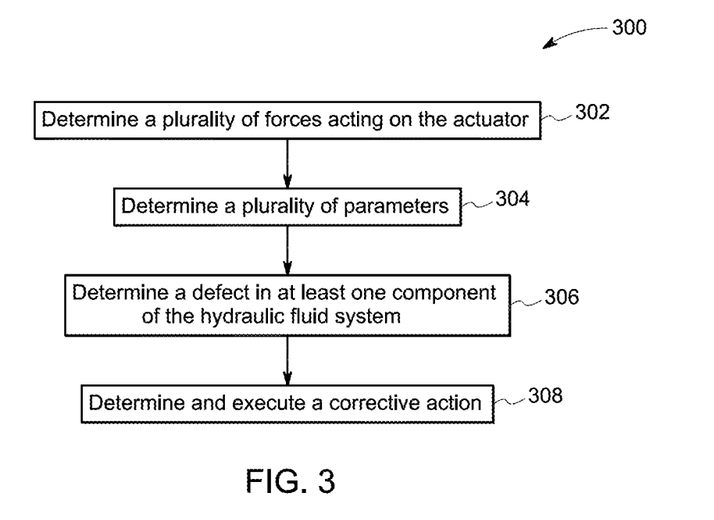
FIG. 3 is a flow chart that illustrates an exemplary method for monitoring health of a hydraulic fluid subsystem in accordance with another embodiment of the present invention.

FIG. 3 is a flow chart that illustrates an exemplary method 300 for monitoring the health of a hydraulic fluid subsystem in accordance with another embodiment of the present invention. At block 302, a plurality of forces acting on the actuator is determined. As previously noted with reference to FIG. 1, the forces may include a hydraulic force, a big spring force, a small spring force, a hyperbaric force, a canister fluid force, a hydraulic fluid force, a viscous friction force due to seal friction, a viscous friction force due to seat friction, a valve friction force, a seal friction force, or the like.

At block 304, a plurality of parameters is determined. As previously noted with reference to FIG. 1, the parameters may include a pressure generated inside the actuator, an amount of displacement and acceleration of a piston located in a cylinder of the actuator caused by at least one of the actuator inlet flow rate ($q_3$) and the actuator outlet flow rate ($q_3'$). Determination of the parameters is explained in greater detail with reference to FIG. 4. Subsequently, at block 306, a defect in at least one component of the hydraulic fluid subsystem may be determined based on the determined parameters. For example, the determined parameters may be compared to respective determined thresholds to determine the presence or absence of the defect in at least one component of the hydraulic fluid subsystem. For example, the presence or absence of the defect in at least one component of the hydraulic fluid subsystem may be determined when the determined parameters exceed the respective determined thresholds. In one embodiment, the defect in at least one component of the hydraulic fluid subsystem may be determined by comparing the pressure generated inside the actuator 118 to the actuator inlet pressure ($p_3$). In one embodiment, if a defect is identified in at least one component of the hydraulic fluid subsystem, then at block 308, a corrective action is determined and executed by a user. The corrective action, for example, may include replacing or repairing the defective component.

Figure 4:
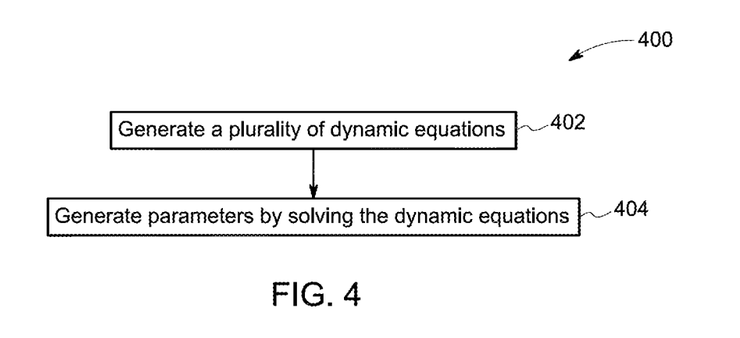
FIG. 4 is a flow chart that illustrates an exemplary method for determining a plurality of parameters in accordance with the embodiment of FIG. 3.

FIG. 4 is a flow chart that illustrates an exemplary method 400 for determining the parameters referred to in FIG. 3 in accordance with one embodiment of the present invention. At block 402, a plurality of dynamic equations are generated. As previously noted with reference to FIG. 1, the dynamic equations, for example, are generated based on one or more of the forces determined at block 302 in FIG. 3, the actuator inlet flow rate ($q_3$), the actuator outlet flow rate ($q_3'$), an area (A) of the cylinder of the actuator, a volume (V) of the cylinder, a damping coefficient of the cylinder, a spring stiffness of a spring in the cylinder, and the forces acting on the actuator. The dynamic equations, for example, may be the equations (4) and (5). Subsequently at block 404, the parameters are determined by solving the dynamic equations to determine the parameters.

The present systems and methods predict and/or detect defects in hydraulic fluid subsystem. The present systems and methods predict and/or detect the defects with minimum available and existing sensors in the hydraulic fluid subsystem. Unlike existing systems that provide telemetry data for a user to review and make a decision, the present systems and methods raise alarms or inform an operator/user about presence of the defect. The present systems and methods may detect and/or detect the defects in semi real time or real time.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for monitoring health of a hydraulic fluid subsystem, the method comprising:
    determining a plurality of forces acting on an actuator of the hydraulic fluid subsystem, the plurality of forces being generated, at least in part, by a valve control system comprising:
        an accumulator fluidly coupled to the actuator;
        a directional control valve within a flow path between the accumulator and the actuator;
        a first sensor associated with the accumulator;
        a second sensor along the flow path between the directional control valve and the actuator; and
        a third sensor associated with an outlet flow path of the directional control valve;
    generating a plurality of dynamic equations based on the plurality of forces and one or more of an actuator inlet flow rate, an actuator outlet flow rate, an area of a cylinder of the actuator, a volume of the cylinder, a damping coefficient of the cylinder, and a stiffness of a spring in the cylinder;

generating, from at least some of the plurality of dynamic equations, a plurality of parameters associated with operation of the actuator;

receiving a valve inlet pressure of one or more of oil and gas flowing through a pipe while entering a valve operationally coupled to the actuator, and a valve outlet pressure of the one or more of the oil and the gas flowing through the pipe while flowing out of the valve;

determining, based at least on the plurality of forces acting on the actuator, the valve inlet pressure, the valve outlet pressure, and at least some of the plurality of parameters, that a first likelihood of one or more defects in a component of the hydraulic fluid system is below a threshold;

communicating absence of the one or more defects;

monitoring, after communicating the absence of the one or more defects, the health of the hydraulic fluid subsystem based, at least, on the plurality of forces acting on the actuator and at least some of the plurality of parameters;

determining, after monitoring the hydraulic fluid subsystem for a period of time after communicating the absence of the defect, and based at least on the plurality of forces acting on the actuator, the valve inlet pressure, the valve outlet pressure, and at least some of the plurality of parameters, that a second likelihood of one or more defects in the component of the hydraulic fluid system is above a threshold;

determining, based at least on one or more selected parameters, of the plurality of parameters used to determine the presence of the one or more defects, that the one or more defects is associated with the actuator;

responsive to determining the one or more defects is associated with the actuator, identifying a cause of the one or more defects based, at least, on the valve inlet pressure, the valve outlet pressure, and a portion of the one or more selected parameters;

generating an alarm to inform a user of the one or more defects in semi real time or real time; and causing, responsive to the alarm, execution of a corrective action to repair the one or more defects.

2. The method of claim 1, wherein monitoring the health of the hydraulic fluid subsystem comprises comparing the plurality of parameters to respective determined thresholds to determine the one or more defects in the hydraulic fluid subsystem.

3. The method of claim 1, wherein the plurality of parameters comprise one or more of a pressure generated inside the actuator, an amount of displacement of a piston located in the cylinder of the actuator, an amount of time for attaining a desired amount of displacement of the piston, an amount of time for reaching an end position of the piston, and an acceleration of the piston located in the cylinder of the actuator caused by one or more of the actuator inlet flow rate and the actuator outlet flow rate, and a force required to open the actuator.

4. The method of claim 3, wherein determining the cause of the one or more defects comprises determining a presence of a seal leakage or a leakage in the actuator by comparing the amount of time for attaining the desired amount of displacement of the piston to a predetermined amount of time.

5. The method of claim 3, wherein determining the cause of the one or more defects comprises determining a failure of the spring by comparing the force required to open the actuator to a threshold force.

6. The method of claim 1, wherein monitoring the health of the hydraulic fluid subsystem comprises comparing the pressure generated inside the actuator to an actuator inlet pressure.

7. The method of claim 6, further comprising:

receiving or determining a directional-control-valve-supply pressure of a hydraulic fluid transferred by the accumulator to the directional control valve;

receiving the actuator inlet pressure of the hydraulic fluid received by the actuator from the directional control valve during a power stroke of the actuator; and determining the actuator inlet flow rate of the hydraulic fluid transferred from the directional control valve to the actuator during the power stroke of the actuator based on one or more of the directional-control-valve-supply pressure and the actuator inlet pressure.

8. The method of claim 7, further comprising determining the actuator inlet flow rate of the hydraulic fluid based on one or more of a determined constant, a specific gravity of the hydraulic fluid and a flow coefficient of the directional control valve.

9. The method of claim 7, further comprising:

receiving an actuator outlet pressure of an actuator hydraulic fluid transferred from the actuator to the directional control valve during a return stroke of the actuator; and determining the actuator outlet flow rate of the hydraulic fluid transferred from the actuator to the directional control valve during the return stroke of the actuator based on one or more of the actuator outlet pressure and a vent pressure of a portion of the actuator hydraulic fluid vented out of the directional control valve.

10. The method of claim 9, further comprising determining the actuator outlet flow rate of the actuator hydraulic fluid based on one or more of a determined constant, a specific gravity of the hydraulic fluid, and a flow coefficient of the directional control valve.

11. A system comprising:

an actuator of a hydraulic fluid subsystem;

a valve controllably coupled to the actuator;

an accumulator fluidly coupled to the actuator;

a directional control valve within a flow path between the accumulator and the actuator;

a first sensing device associated with the accumulator;

a second sensing device along the flow path between the directional control valve and the actuator;

a third sensing device associated with an outlet flow path of the directional control valve; and a processing subsystem operationally coupled to the first sensing device, the second sensing device, and the third sensing device and configured to:

determine a plurality of forces acting on the actuator;

generate a plurality of dynamic equations based on the plurality of forces and one or more of an actuator inlet flow rate, an actuator outlet flow rate, an area of a cylinder of the actuator, a volume of the cylinder, a damping coefficient of the cylinder and a stiffness of a spring in the cylinder;

generate, from at least some of the plurality of dynamic equations, a plurality of parameters associated with operation of the actuator;

receive a valve inlet pressure of one or more of oil and gas flowing through a pipe while entering a valve operationally coupled to the actuator and a valve outlet pressure of the one or more of the oil and the gas flowing through the pipe while flowing out of the valve;

determine, based at least on the plurality of forces acting on the actuator, the valve inlet pressure, the valve outlet pressure, and at least some of the plurality of parameters, that a likelihood of one or more defects in a component of the hydraulic fluid system is below a first threshold;

communicate absence of the one or more defects;

monitor, after communicating the absence of the one or more defects, the health of the hydraulic fluid subsystem based, at least, on the plurality of forces acting on the actuator and at least some of the plurality of parameters;

determine, after monitoring the hydraulic fluid subsystem for a period of time after communicating the absence of the defect, and based at least on the plurality of forces acting on the actuator, the valve inlet pressure, the valve outlet pressure, and at least some of the plurality of parameters, that a second likelihood of one or more defects in the component of the hydraulic fluid system is above a second threshold;

determine, based at least on one or more selected parameters, of the plurality of parameters used to determine the presence of the one or more defects, that the one or more defects is associated with the actuator;

in response to determining the one or more defects is associated with the actuator, identify a cause of the one or more defects based, at least, on the valve inlet pressure, the valve outlet pressure, and a portion of the one or more selected parameters;

generate an alarm to inform a user of the one or more defects in semi real time or real time; and cause, responsive to the alarm, execution of a corrective action to repair the one or more defects.

12. The system of claim 11, wherein the processing subsystem is configured to monitor the health of the hydraulic fluid subsystem by comparing the plurality of parameters to respective determined thresholds to determine the one or more defects a defect in the hydraulic fluid subsystem.

13. The system of claim 11, wherein the plurality of parameters comprise one or more of a pressure generated inside the actuator, an amount of displacement of a piston located in the cylinder of the actuator, an amount of time for attaining a desired amount of displacement of the piston, an amount of time for reaching an end position of the piston, and an acceleration of the piston located in the cylinder of the actuator caused by one or more of the actuator inlet flow rate and the actuator outlet flow rate, and a force required to open the actuator.

14. The system of claim 13, wherein the processing subsystem is configured to monitor the health of the hydraulic fluid subsystem by comparing the pressure generated inside the actuator to an actuator inlet pressure.

15. The system of claim 14, wherein the processing subsystem is further configured to:

receive or determine a directional control valve supply pressure of a hydraulic fluid transferred by the accumulator to the directional control valve;

receive the actuator inlet pressure of the hydraulic fluid received by the actuator from the directional control valve during a power stroke of the actuator; and determine the actuator inlet flow rate of the hydraulic fluid transferred from the directional control valve to the actuator during the power stroke of the actuator based on one or more of the directional-control-valve-supply pressure and the actuator inlet pressure.

16. The system of claim 15, wherein the processing subsystem is configured to determine the actuator inlet flow rate of the hydraulic fluid based on one or more of a determined constant, a specific gravity of the hydraulic fluid and a flow coefficient of the directional control valve.

17. The system of claim 15, wherein the processing subsystem is configured to:

receive an actuator outlet pressure of an actuator hydraulic fluid transferred from the actuator to the directional control valve during a return stroke of the actuator; and determine the actuator outlet flow rate of the hydraulic fluid transferred from the actuator to the directional control valve during the return stroke of the actuator based on one or more of the actuator outlet pressure and a vent pressure of a portion of the actuator hydraulic fluid vented out of the directional control valve.

18. The system of claim 17, wherein the processing subsystem is configured to determine the actuator outlet flow rate of the actuator hydraulic fluid based on one or more of a determined constant, a specific gravity of the hydraulic fluid, and a flow coefficient of the directional control valve.

19. The system of claim 11, wherein the processing subsystem is configured to determine an amount of flow that entered the cylinder while a minimum actuator inlet pressure is changed to a maximum actuator inlet pressure, and compare the amount of flow to a determined swept volume of the cylinder to determine whether a leak or jam exists in the cylinder of the actuator.

20. The system of claim 11, wherein the processing subsystem is configured to determine a presence of stem damage or damage in the piston of the actuator if an amount of time for reaching an end position of the piston is greater than a predetermined amount of time.

* * * * *